Dec. 10, 1968   F. FRÜNGEL   3,415,984
INCIPIENT FOG DETECTING SYSTEM AND METHOD
Filed Feb. 25, 1965   2 Sheets-Sheet 1
FIG.1
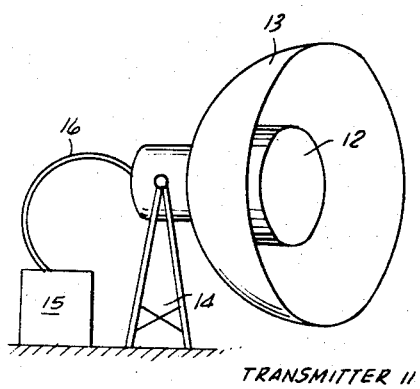
TRANSMITTER 11
FIG.2
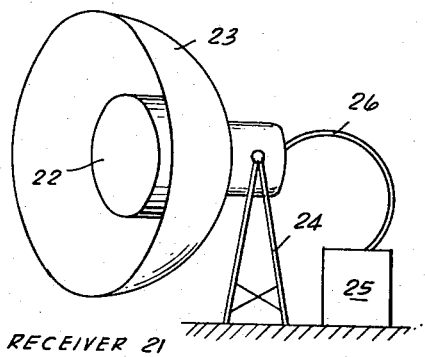
RECEIVER 21
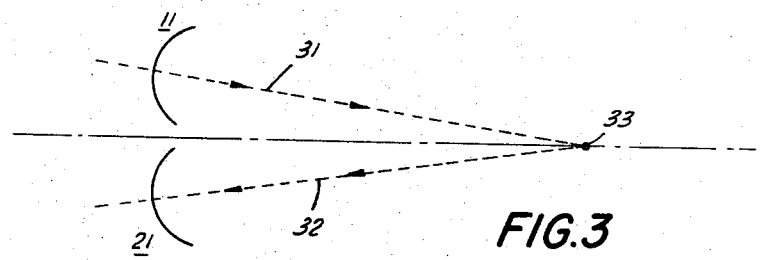
FIG.3
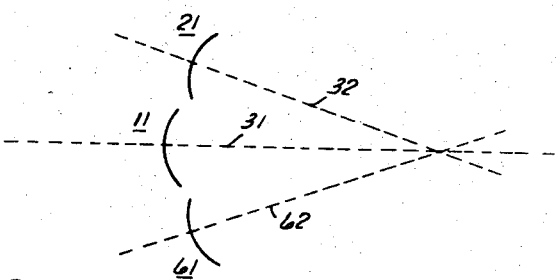
FIG.6
INVENTOR
Frank Früngel
BY
Michael J. Striker
ATTORNEY

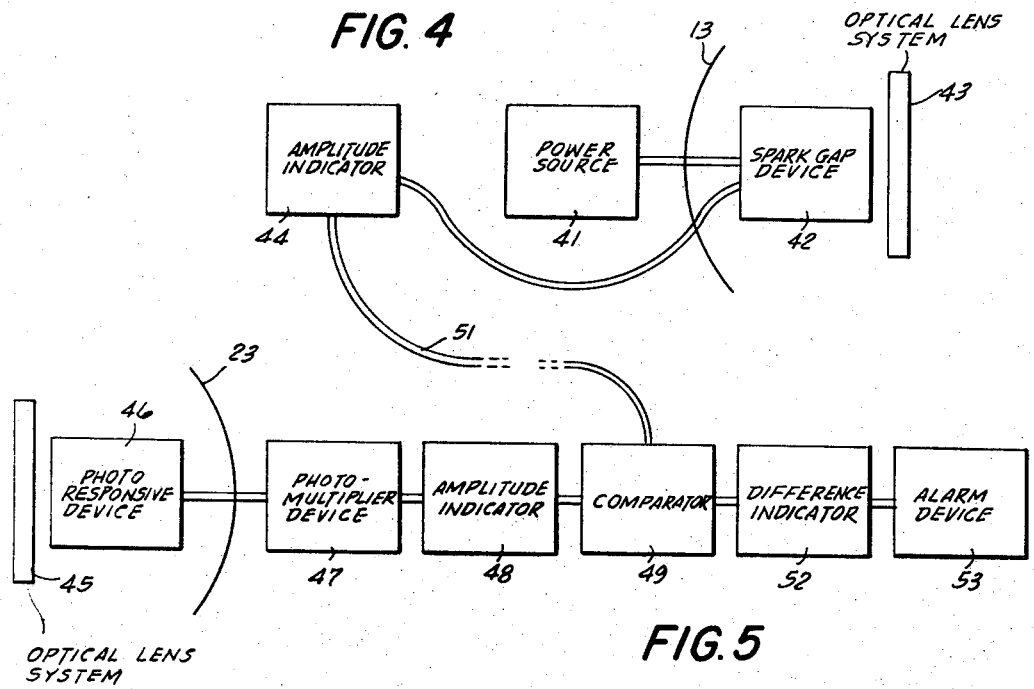
FIG. 4
FIG. 5
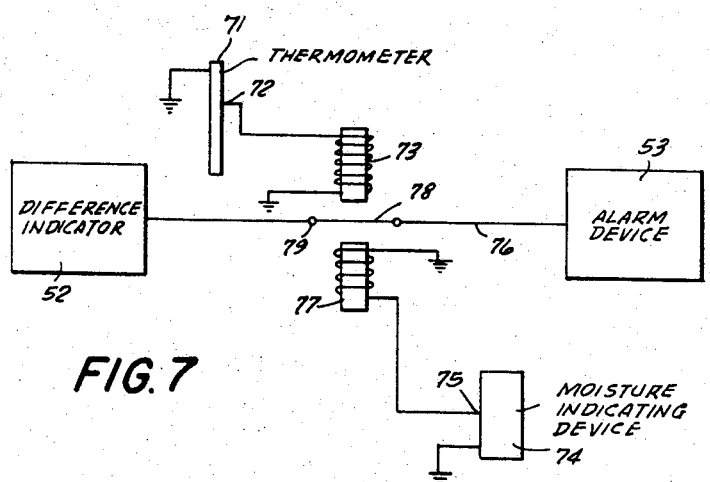
FIG. 7

United States Patent Office 3,415,984
Patented Dec. 10, 1968

3,415,984
INCIPIENT FOG DETECTING SYSTEM
AND METHOD
Frank Früngel, Herwigredder 105a,
Hamburg-Rissen, Germany
Filed Feb. 25, 1965, Ser. No. 435,301
Claims priority, application Germany, Feb. 29, 1964,
F 42,161
13 Claims. (Cl. 250—43.5)

ABSTRACT OF THE DISCLOSURE

Spark gap generation of ultraviolet pulses in the microsecond range. Directional transmission of pulses of determined amplitude and reception after reflection and refraction from moisture droplets or impurities in air. The greater the concentration of impurities the greater the amplitude of received pulse. Comparison of transmitted and received pulse used as indication of moisture concentration. Alarm means if moisture concentration exceeds predetermined amount. Sounding of alarm prevented in case temperature or humidity not conducive to fog formation.

The present invention relates to an incipient fog detecting system and method. More particularly, the invention relates to a system and method for detecting incipient fog, fog and various conditions such as, for example, pollution in the atmosphere.

The detection of incipient fog is of great importance generally in meteorology and specifically at harbors and airfields. Various methods for incipient fog detection have been utilized with little or no success. These include ion counting systems, temperature gradient measuring systems, moisture measuring systems and various combinations of these systems.

The principal object of the present invention is to provide a new and improved detecting system and method for incipient fog, fog and various atmosphere conditions.

In order that the present invention may be readily carried into effect, it will now be described with reference to the accompanying drawings, wherein:

FIG. 1 is a perspective view of an embodiment of a transmitter of the incipient fog detecting system of the present invention;

FIG. 2 is a perspective view of an embodiment of a receiver of the incipient fog detecting system of the present invention;

FIG. 3 is a schematic diagram of an embodiment of the incipient fog detecting system of the present invention;

FIG. 4 is a schematic block diagram of an embodiment of a transmitter of the incipient fog detecting system of the present invention;

FIG. 5 is a schematic block diagram of an embodiment of a receiver of the incipient fog detecting system of the present invention;

FIG. 6 is a schematic diagram of an embodiment of the particle or droplet size measuring system of the present invention; and FIG. 7 is a schematic diagram of an embodiment of a further control system for the incipient fog detecting system of the present invention.

In the figures, the same components are identified by the same reference numerals.

Fog includes a dense concentration of droplets of moisture or water which greatly hinder daylight and artificial light in the visual spectrum and therefore hinder vision or visible light, due to their size and quantity. Fog, however, in its incipient stages, includes droplets which are small enough to have no great effect on the transmission of daylight and artificial light so that it is not readily visiually detectable in its incipient stages. The small droplets of moisture or water in the incipient fog are susceptible, however, to detection by very short-wave ultra-violet light which is diffracted and reflected by such droplets.

Ultraviolet pulses are preferably utilized in the system and method of the present invention rather than constant ultraviolet light to avoid the effects of daylight on system. The ultraviolet pulses have a peak intensity for a relatively small input energy in producing them. The ultraviolet pulses may be produced by a spark gap in an open area energized by a low induction capacitor circuit. If the air pressure of the atmosphere in the open area produces adverse and excessive fluctuations of intensity of the produced ultraviolet pulses, the spark gap may be positioned in a closed housing which may be filled with an inert or rare gas or gases such as, for example, argon.

Furthermore, it is preferable for effective operation of the system and method of the present invention that a plurality of ultraviolet light quanta be simultaneously received by the ultraviolet receiver. There is very little light diffracted and reflected in the ultraviolet range by a given volume of atmosphere when a fine fog is in its incipiency and there is good visibility or good transmission of visible light. It is therefore necessary that a great number of ultraviolet light quanta be simultaneously received by the receiver of the system to insure that a sufficient portion of such ultraviolet light quanta reach the photoresponsive device of said receiver to enable suitable detection of the transmitted and diffracted and reflected ultraviolet pulses. The utilization of a source of constant ultraviolet light would entail the use of a very strong arc lamp system.

In the embodiment of FIG. 1, a transmitter 11 comprises a short-wave ultraviolet pulse generator 12 positioned at the focus of a suitable reflector 13. The reflector 13 may comprise, for example, a parabolic configuration coated with an ultraviolet wave reflecting material such as, for example, aluminum, and having a short focal length. The entire reflector 13 may be made of aluminum, of course. The short-wave ultraviolet pulse generator 12 may comprise, for example, a quartz lamp filled with an inert or rare gas such as, for example, argon, and housing a suitable spark gap providing a discharge energy of approximately one joule per spark. A suitable spark gap is constructed of Wolfram metal or a Wolfram metal alloy.

The reflector 13 may be mounted for suitable pivotal movement in a substantially horizontal plane and in a substantially vertical plane by any suitable known mounting means 14. The ultraviolet pulse generator 12 is connected to a pulse producing current arrangement 15 via electrical conductors 16.

The shorter the wavelength of the ultraviolet pulses produced by the transmitter, the more readily will the incipient fog be detected. One limit set on the frequency or wavelength of the transmitted ultraviolet light pulses is due to the fact that the oxygen content of air makes air no longer transparent below a wavelength of approximately 1800 A. The other limit set on the wavelength of the transmitted ultraviolet light pulses is due to what is known as Aitken's nuclei. Aitken's nuclei are particles of a diameter in the range of from $10^{-4}$ to $10^{-5}$ cm. which are presently believed to be the hypothetical basis for the development of condensate nuclei. These condensate nuclei are not readily detectable by the system of the present invention since only the largest, which are in the order of $10^{-4}$ cm. in diameter, create any measurable diffraction or reflection.

In the embodiment of FIG. 2, a receiver 21 comprises a short-wave ultraviolet pulse receiver 22 positioned at the focus of a suitable reflector 23. The reflector 23 may comprise, for example, a parabolic configuration coated with an ultraviolet wave reflecting material such as, for example, aluminum, and having a short focal length. The entire reflector 23, may be made of aluminum, of course.

The short-wave ultraviolet pulse receiver 22 may comprise any suitable photoresponsive device which responds to diffracted and reflected ultraviolet pulses transmitted from the transmitter and directed to said photoresponsive device by any suitable optical lens system. The photoresponsive device may comprise, for example, a low-reluctance rubidium or cesium-tellurium or cesium-iodide cathode which responds only to wavelengths below 3000 A. The photoresponsive device may be utilized with any suitable photomultiplier device.

The cesium-telluride, rubidium-telluride or cesium-iodide cathode is non-responsive to daylight since short-wave ultraviolet light is almost completely absent from the atmosphere at the surface of the earth. The absence of ultraviolet light at the surface of the earth is due to its absorption in the ozone layer at an elevation above the earth of about 25 kilometers.

The reflector 23 may be mounted for suitable pivotal movement in a substantially horizontal plane and in a substantially vertical plane by any suitable known mounting means 24. The ultraviolet pulse receiver 22 is connected to a pulse indicating arrangement 25 via electrical conductors 26.

FIG. 3 is an embodiment of the incipient fog detecting system of the present invention and of a system for performing the incipient fog detecting method of the present invention. In FIG. 3, the transmitter 11 and the receiver 12 are positioned spaced from each other in the atmosphere, said transmitter being at a first location and said receiver being at another location spaced from said first location. In a preferred embodiment of the invention, the transmitter and receiver are spaced approximately 30 cm. from each other.

In a preferred embodiment of the invention, the optical axis 31 of the transmitted ultraviolet beam from the transmitter 11 and the optical axis 32 of the receiver 21 are at an acute angle with each other, the transmitter and receiver being positioned in side by side relation to each other. The point of intersection 33 of the optical axes 31 and 32 is between 10 and 50 meters from the transmitter and receiver, and in a preferred embodiment of the invention is approximately 30 meters from said transmitter and receiver. Thus, the ratio of the distance or space between the transmitter 11 and the receiver 21 to the distance of the point of intersection of the optical axes of the transmitter and receiver is preferably 1:100 in a preferred embodiment of the invention.

The receiver 21 will detect even pure so-called Raileygh diffraction of the atmosphere. The diffraction and reflection of the ultraviolet light pulses transmitted from the transmitter 11 by the moisture droplets, water droplets or other particles in the atmosphere or air increase the amplitude or intensity of the pulses in accordance with the density or number or number per unit volume of air of such droplets or particles. Thus, if the ultraviolet light pulses received by the receiver 21 are measured in amplitude or intensity, the difference in amplitude or intensity of the received pulses relative to the transmitted pulses is an indication of the amount of moisture or water droplets, and therefore of incipient fog or fog, of the atmosphere, or an indication of foreign particles, and therefore pollution or other similar disturbance of the atmosphere. The greater the concentration of moisture or water droplets or particles in the atmosphere or air, the greater the intensity or amplitude of the received ultraviolet pulses.

FIG. 4 is a schematic block diagram of an embodiment of a transmitter which may be utilized on the incipient fog detecting system of the present invention. In FIG. 4, a suitable power source 41 energizes a suitable spark gap device 42 to produce ultraviolet light pulses which are directed in beam form by the reflector 13 via a suitable optical lens system 43 which may comprise, for example, quartz lenses. The amplitude or intensity of the transmitted ultraviolet light pulses is measured by an amplitude indicator 44 connected to the spark gap device.

FIG. 5 is a schematic block diagram of an embodiment of a receiver which may be utilized in the incipient fog detecting system of the present invention. In FIG. 5, a suitable lens system 45 comprising, for example, quartz lenses, directs the received ultraviolet light pulses, after transmission, diffraction and reflection, to the reflector 23. The reflector 23 directs the ultraviolet pulses to a suitable photoresponsive device 46. A suitable photomultiplier device 47 is connected to the photoresponsive device 46 and magnifies the received ultraviolet light pulses to a determined degree.

A suitable amplitude indicator 48 is connected to the photomultiplier 47 and measures the amplitude or intensity of the received ultraviolet light pulses, taking into account the degree of magnification provided by said photomultiplier. The output indication of the amplitude indicator 44 of the transmitter is supplied to a suitable comparator 49 via an electrical conductor 51 and the output indication of the amplitude indicator 48 of the receiver is supplied to the comparator 49. The comparator 49 compares the magnitudes, amplitudes or intensities of the transmitted and received pulses and supplies a signal to a suitable difference indicator 52 which produces an indication of the difference in amplitude, magnitude or intensity of the transmitted and received ultraviolet light pulses. A suitable alarm device 53 may be connected to the difference indicator 52 to provide a visual and audible alarm when the difference of intensity or amplitude of the transmitted and received ultraviolet pulses indicates the presence of incipient fog, fog or pollution or the like in the atmosphere.

Each of the components of the embodiments of FIGS. 4 and 5 may comprise any suitable known device.

The system and method of the present invention may be utilized to detect and measure air or atmospheric pollution of foreign particles in the air which is or are too insignificant for chemical detection.

The system and method of the present invention may also be utilized to measure the sizes of droplets of moisture or water or foreign particles in the air. This would entail the use of two ultraviolet light receivers, one for detecting very short-wave ultraviolet light pulses and the other for detecting medium short-wave ultraviolet light pulses. The difference between the amplitudes or intensities indicated by both receivers corresponds to the average size of the droplets or particles in the tested atmosphere.

An arrangement for measuring the size of droplets or particles in the atmosphere or air as hereinbefore described is shown in schematic form in FIG. 6. The components of the system of FIG. 6 are those of FIG. 3 with the addition of a second ultraviolet light receiver 61 which has an optical axis 62.

The alarm device 53 of FIG. 5 may be activated due to the fact that the detecting system of FIG. 3 may detect the presence of incipient fog in the air, but the moisture in the air may be insufficient to permit the detected droplets to increase sufficiently to produce an actual fog. To prevent such an occurrence, a moisture-indicating device of known type may be utilized with a thermometer of known type. The moisture-indicating device indicates the necessary minimum moisture content of the air and the thermometer indicates the temperature. Thus, if the moisture content of the air falls below the minimum or if the temperature is above a minimum, these conditions are indicated to indicate an insufficiency of moisture in the air.

The moisture-indicating device and thermometer may be utilized with the system of the present invention, in the manner shown in FIG. 7, to provide a further control in the incipient fog detecting operation of such system to prevent the operation of the alarm device 53 (FIG. 5), if there is insufficient moisture in the air or if the temperature of the air is too high to permit fog formation.

In FIG. 7, any suitable thermometer 71 is provided with an electrical contact at a predetermined temperature level 72 and the contact closes an electrical circuit to open the supply line 76 to the alarm device 53 via a suitable relay-operated switch device 73 when the thermometer indicates a temperature of or above said predetermined temperature level.

In FIG. 7, any suitable moisture-indicating device 74 is provided with an electrical contact at a predetermined moisture level 75 and the contact closes an electrical circuit to open the supply line 76 to the alarm device 53 via a suitable relay-operated switch device 77 when the moisture-indicating device indicates a moisture of or below said predetermined moisture level.

In the embodiment of FIG. 7, which may, of course, be modified in any suitable manner, the supply line 76 is normally closed by a switch arm 78. The switch arm 78 is pivoted about its pivot contact 79 in a counter-clockwise direction, to open the supply line 76 and thereby prevent operation of the alarm device 53, when the relay operated switch device 73 is energized by the thermometer 71. The switch arm 78 is pivoted about its pivot contact 79 in a clockwise direction, to open the supply line 76 and thereby prevent operation of the alarm device 53, when the relay-operated switch device 77 is energized by the moisture indicator 74.

While the invention has been described by means of specific examples and in specific embodiments, I do not wish to be limited thereto, for obvious modifications will occur to those skilled in the art without departing from the spirit and scope of the invention.

What I claim is:

1. A method for detecting moisture droplets and foreign particles in the atmosphere, comprising the steps of
producing short-wave ultraviolet radiation pulses having determined characteristics;
transmitting the produced ultraviolet radiation pulses in substantially beam form at a location in the atmosphere;
receiving the transmitted ultraviolet radiation pulses after diffraction and reflection by moisture droplets and foreign particles in the atmosphere at a location in the atmosphere spaced from the transmitting location;
deriving the characteristics of the received ultraviolet radiation pulses;
comparing the characteristics of the received ultraviolet radiation pulses with the determined characteristics of the transmitted ultraviolet radiation pulses; and
indicating the difference in characteristics of the transmitted and received ultraviolet radiation pulses thereby indicating the presence and intensity of moisture droplets and foreign particles in the atmosphere.

2. A method for detecting moisture droplets and foreign particles in the atmosphere, comprising the steps of
producing short-wave ultraviolet radiation pulses having determined characteristics;
transmitting the produced ultraviolet radiation pulses in substantially beam form at a location in the atmosphere;
receiving the transmitted ultraviolet radiation pulses after diffraction and reflection by moisture droplets and foreign particles in the atmosphere at a location in the atmosphere spaced but in proximity with the transmitting location;
deriving the characteristics of the received ultraviolet radiation pulses;
comparing the characteristics of the received ultraviolet radiation pulses with the determined characteristics of the transmitted ultraviolet radiation pulses; and
indicating the difference in characteristics of the transmitted and received ultraviolet radiation pulses thereby indicating the presence and intensity of moisture droplets and foreign particles in the atmosphere.

3. A method for detecting incipient fog in the atmosphere, comprising the steps of
producing very short-wave ultraviolet light pulses having determined amplitudes;
transmitting the produced ultraviolet pulses in substantially beam form at a location in the atmosphere;
receiving the transmitted ultraviolet pulses after diffraction and reflection by moisture droplets and foreign particles in the atmosphere at a location in the atmosphere closely spaced from the transmitting location in such a manner that the path of transmitted-received ultraviolet pulses constitutes an acute angle;
deriving the amplitudes of the received ultraviolet pulses;
comparing the amplitudes of the received ultraviolet pulses with the determined amplitudes of the transmitted ultraviolet pulses; and
indicating the difference in amplitude of the transmitted and received ultraviolet pulses thereby indicating the presence and intensity of incipient fog droplets and foreign particles in the atmosphere.

4. A method for detecting incipient fog and foreign particles in the atmosphere, comprising the steps of
producing very short-wave ultraviolet light pulses at a wavelength less than 3000 A. having determined amplitudes;
transmitting the produced ultraviolet pulses in substantially beam form at a location in the atmosphere;
receiving the transmitted ultraviolet pulses after diffraction and reflection by moisture droplets and foreign particles in the atmosphere at a location in the atmosphere closely spaced from the transmitting location;
deriving the amplitudes of the received ultraviolet pulses;
comparing the amplitudes of the received ultraviolet pulses with the determined amplitudes of the transmitted ultraviolet pulses; and
indicating the difference in amplitude of the transmitted and received ultraviolet pulses thereby indicating the presence and intensity of incipient fog droplets and foreign particles in the atmosphere.

5. A method for detecting incipient fog and foreign particles in the atmosphere, comprising the steps of
producing very short-wave ultraviolet light pulses having determined amplitudes;
transmitting the produced ultraviolet pulses in substantially beam form at a location in the atmosphere;
receiving the transmitted ultraviolet pulses after diffraction and reflection by moisture droplets and foreign particles in the atmosphere at a location in the atmosphere closely spaced from the transmitting location;
deriving the amplitudes of the received ultraviolet pulses;
comparing the amplitudes of the received ultraviolet pulses with the determined amplitudes of the transmitted ultraviolet pulses;
indicating the difference in amplitude of the transmitted and received ultraviolet pulses thereby indicating the presence and intensity of incipient fog droplets and foreign particles in the atmosphere; and
providing an alarm when the indicated difference exceeds a determined magnitude.

6. A method for detecting incipient fog in the atmosphere, comprising the steps of producing very short-wave ultraviolet light pulses having determined amplitudes;

transmitting the produced ultraviolet pulses in substantially beam form at a location in the atmosphere;

receiving the transmitted ultraviolet pulses after diffraction and reflection by moisture droplets and foreign particles in the atmosphere at a location in the atmosphere closely spaced from the transmitting location;

deriving the amplitudes of the received ultraviolet pulses;

comparing the amplitudes of the received ultraviolet pulses with the determined amplitudes of the transmitted ultraviolet pulses;

indicating the difference in amplitude of the transmitted and received ultraviolet pulses thereby indicating the present and intensity of incipient fog droplets and foreign particles in the atmosphere;

providing an alarm when the indicated difference exceeds a determined magnitude; and preventing operation of the alarm when the moisture in the atmosphere is less than a determined amount.

7. A method for detecting incipient fog in the atmosphere, comprising the steps of producing very short-wave ultraviolet light pulses having determined amplitudes;

transmitting the produced ultraviolet pulses in substantially beam form at a location in the atmosphere;

receiving the transmitted ultraviolet pulses after diffraction and reflection by moisture droplets and foreign particles in the atmosphere at a location in the atmosphere closely spaced from the transmitting location;

deriving the amplitudes of the received ultraviolet pulses;

comparing the amplitudes of the received ultraviolet pulses with the determined amplitudes of the transmitted ultraviolet pulses;

indicating the difference in amplitude of the transmitted and received ultraviolet pulses thereby indicating the presence and intensity of incipient fog droplets and foreign particles in the atmosphere;

providing an alarm when the indicated difference exceeds a determined magnitude; and preventing operation of the alarm when the temperature of the atmosphere is greater than a determined amount.

8. A system for detecting incipient fog in the atmosphere, comprising producing means for producing very short-wave ultraviolet light pulses having a wave length of less than 3000 A., and having determined amplitudes; transmitter means coupled to said producing means for transmitting the produced ultraviolet light pulses in substantially beamed form, said transmitter means comprising a reflector having an optical axis, said transmitter means being situated at a location in the atmosphere; receiver means for receiving the transmitted ultraviolet pulses after diffraction and reflection by incipient fog droplets in the atmosphere, said receiver means comprising a reflector having an optical axis positioned in close proximity with said transmitter reflector and opening in the same direction, said optical axes of said transmitter and receiver means intersecting each other at a very great distance from said reflector relative to the distance between said reflectors; deriving means connected to said receiver means for deriving amplitudes of the received ultraviolet pulses; comparing means connected to said deriving means and to said producing means for comparing the amplitudes of the received ultraviolet pulses with the determined amplitudes of the transmitted ultraviolet pulses; and indicating means connected to said comparing means for indicating the difference in amplitude of the transmitted and received ultraviolet light pulses, thereby indicating the presence and intensity of incipient fog droplets in the atmosphere.

9. A system as claimed in claim 8, wherein said receiver means comprises photoresponsive means and photomultiplier means including a cathode of a material which is non-responsive to daylight.

10. A system as claimed in claim 8, wherein said receiver means comprises photoresponsive means and photomultiplier means including a cathode of one of cesium-iodide, cesium-tellurium and rubidium-tellurium.

11. A system as claimed in claim 8, further comprising alarm means connected to said indicating means for providing an alarm when the indicated difference in amplitude exceeds a predetermined magnitude.

12. A system as claimed in claim 8, further comprising alarm means connected to said indicating means for providing an alarm when the indicated difference in amplitude exceeds a predetermined magnitude, moisture-indicating means and coupling means coupling said alarm means to said moisture-indicating means in a manner whereby said moisture-indicating means disconnects said alarm means from said indicating means when the moisture in the atmosphere is less than a determined amount.

13. A system as claimed in claim 8, further comprising alarm means connected to said indicating means for providing an alarm when the indicated difference in amplitude exceeds a predetermined magnitude, temperature-indicating means and coupling means coupling said alarm means to said temperature-indicating means in a manner whereby said temperature-indicating means disconnects said alarm means from said indicating means when the temperature of the atmosphere is greater than a determined amount.

References Cited
UNITED STATES PATENTS

| | | | |
|---|---|---|---|
| 2,237,193 | 4/1941 | Mubsby | 250—83.3 |
| 2,504,981 | 4/1950 | Hulburt | 250—83.6 |
| 2,654,845 | 10/1953 | Presenz | 250—43.5 |
| 2,758,215 | 8/1956 | Skarstrom | 250—43.5 |
| 2,930,893 | 3/1960 | Carpenter et al. | 250—43.5 |
| 3,299,769 | 1/1967 | Byers | 88—14 |

RALPH G. NILSON, *Primary Examiner.*

S. ELBAUM, *Assistant Examiner.*

U.S. Cl. X.R.

88—14; 250—83.3; 340—228